US011572917B2

(12) United States Patent
Goto (10) Patent No.: US 11,572,917 B2
(45) Date of Patent: Feb. 7, 2023

(54) SLIDING BEARING AND CRANKSHAFT SUPPORT STRUCTURE

(71) Applicant: TAIHO KOGYO Co., Ltd., Aichi (JP)

(72) Inventor: Yasuaki Goto, Aichi (JP)

(73) Assignee: Taiho Kogyo Co., Ltd., Aichi (JP)

( * ) Notice: Subject to any disclaimer, the term of this patent is extended or adjusted under 35 U.S.C. 154(b) by 0 days.

(21) Appl. No.: 17/491,781

(22) Filed: Oct. 1, 2021

(65) Prior Publication Data

US 2022/0018387 A1  Jan. 20, 2022

Related U.S. Application Data

(63) Continuation of application No. PCT/JP2020/015012, filed on Apr. 1, 2020.

(30) Foreign Application Priority Data

Apr. 4, 2019 (JP) .............................. JP2019-072273

(51) Int. Cl.
*F16C 9/02* (2006.01)
*F16C 17/02* (2006.01)
*F16C 33/04* (2006.01)

(52) U.S. Cl.
CPC .............. *F16C 9/02* (2013.01); *F16C 17/022* (2013.01); *F16C 33/046* (2013.01)

(58) Field of Classification Search
CPC ...... F16C 9/02; F16C 9/03; F16C 9/04; F16C 9/06; F16C 17/022; F16C 23/02;
(Continued)

(56) References Cited

U.S. PATENT DOCUMENTS 3,168,358 A    2/1965 Buske
3,201,183 A *  8/1965 Buske ................. F16C 33/1075
                                                 384/286
(Continued)

FOREIGN PATENT DOCUMENTS

JP    S57-18814 A     1/1982
JP    H09-303372 A   11/1997
(Continued)

OTHER PUBLICATIONS

International Search Report issued in corresponding International Application No. PCT/JP2020/015012, dated Jun. 23, 2020 (5 pages).
(Continued)

*Primary Examiner* — James Pilkington
(74) *Attorney, Agent, or Firm* — Osha Bergman Watanabe & Burton LLP (57) ABSTRACT

A sliding bearing that is disposed in a cylinder block and supports a journal portion of a crankshaft, including: a semi-annular first split bearing having a first circumferential end surface; and a semi-annular second split bearing having a second circumferential end surface. The first and second circumferential end surfaces contact each other, the first split bearing has a same outer diameter as an outer diameter of the second split bearing, the second split bearing has a thickness at a second circumferentially central position that is greater than a thickness of the first split bearing at a first circumferentially central position, the thickness of the first split bearing is decreased from the first circumferentially central position toward the first circumferential end surface, the thickness of the second split bearing is decreased from the second circumferentially central position toward the second circumferential end surface.

1 Claim, 5 Drawing Sheets

(58) Field of Classification Search
CPC ........ F16C 23/10; F16C 25/02; F16C 33/046; F16C 33/06
See application file for complete search history.

(56) References Cited

U.S. PATENT DOCUMENTS

| | | | |
|---|---|---|---|
| 4,311,349 A * | 1/1982 | Roberts | F16C 17/18 384/288 |
| 5,788,380 A | 8/1998 | Niegel et al. | |
| 2004/0007199 A1 | 1/2004 | Sugimura | |

FOREIGN PATENT DOCUMENTS

| | | |
|---|---|---|
| JP | H09-511050 A | 11/1997 |
| JP | 3906754 B2 | 4/2007 |
| JP | 2018-155355 A | 10/2018 |

OTHER PUBLICATIONS

Written Opinion issued in corresponding International Application No. PCT/JP2020/015012, dated Jun. 23, 2020 (4 pages).
International Preliminary Report on Patentability issued in corresponding International Patent Application No. PCT/JP2020/015012, dated Oct. 14, 2021 (12 pages).
Extended European Search Report issued in corresponding European Application No. 20781884.0, dated Apr. 11, 2022 (5 pages).

* cited by examiner

Before incorporation

FIG. 5B

After incorporation

SLIDING BEARING AND CRANKSHAFT SUPPORT STRUCTURE

CROSS-REFERENCE TO RELATED APPLICATION

The present application claims priority from Japanese Patent Application No. 2019-072273 filed on Apr. 4, 2019, the entirety of which is incorporated herein by reference.

BACKGROUND

Technical Field

The present disclosure relates to a sliding bearing for supporting a crankshaft on a cylinder block and to a crankshaft support structure including the sliding bearing.

Description of the Related Art

A known support structure of such a type which constitutes an engine includes annular sliding bearings provided for journal portions of a crankshaft, and a cylinder block having bearing holding portions by which the bearings are held. Of the bearing holding portions, two bearing holding portions located at opposite ends in the direction in which the axis of the crankshaft extends are used to determine a reference straight line, which is an axial line extending through the radially central positions of the two bearing holding portions. The central positions of the bearing holding portions can be rendered coaxial by reducing deviations of the central positions of the bearing holding portions from the reference straight line.

In the case where a cylinder head and a cylinder head gasket are attached to a cylinder block in an engine production process, elastic bending deformation occurs in the cylinder block due to the attachment. As a result, of the bearing holding portions, a bearing holding portion located at an intermediate position in the direction in which the axis of the crankshaft extends may have a large central position deviation from the reference straight line, and the coaxiality of the bearing holding portions may be impaired. In such a case, the coaxiality of bearings held by the bearing holding portions may be impaired, and the clearance between the inner circumferential surface of each bearing and a corresponding outer circumferential surface of the crankshaft may deviate from a proper value.

Patent Document 1 listed below discloses a support structure comprises a pair of split bearings having different thicknesses. Specifically, at a position where the central position of a certain bearing holding portion deviates upward from the reference straight line, a split bearing having a larger thickness is disposed on the upper side, and a split bearing which is smaller in thickness than the upper-side split bearing is disposed on the lower side. This support structure can enhance the coaxiality of the bearing holding portions, thereby enhancing the coaxiality of the bearings.

PATENT DOCUMENT

Patent Document 1: Japanese Patent No. 3906754

Since a pair of split bearings constituting a bearing differ in thickness, in some cases, a step attributable to the difference in thickness is formed on the inner circumferential side of each of regions where the pair of split bearings abut against each other. It is feared that such a step hinders smooth flow of lubricating oil flowing between the crankshaft and the sliding bearings, and oil films become less likely to be formed between the crankshaft and the sliding bearings.

SUMMARY

One or more embodiments of the present invention provide a sliding bearing which comprises a pair of split bearings having different thicknesses and which facilitates formation of an oil film between a crankshaft and the bearing, and to provide a crankshaft support structure including the sliding bearing.

One or more embodiments provide a sliding bearing which comprises a semi-annular first split bearing and a semi-annular second split bearing, which is provided on a cylinder block in a state in which circumferential end surfaces of the first split bearing and circumferential end surfaces of the second split bearing abut against (or contact) each other, and which supports a journal portion of a crankshaft, wherein the first split bearing and the second split bearing have the same outer diameter; a thickness of the second split bearing at a circumferentially central position is greater than a thickness of the first split bearing at a circumferentially central position; the thickness of the first split bearing is decreased from the circumferentially central position toward the circumferential end surfaces of the first split bearing so that the circumferential end surfaces of the first split bearing have a first dimension in the thickness direction of the first split bearing (hereinafter referred to as the "first thicknesswise dimension"); the thickness of the second split bearing is decreased from the circumferentially central position toward the circumferential end surfaces of the second split bearing so that the circumferential end surfaces of the second split bearing have a second dimension in the thickness direction of the second split bearing (hereinafter referred to as the "second thicknesswise dimension"); and the first thicknesswise dimension and the second thicknesswise dimension are equal to each other.

In one or more embodiments, the first thicknesswise dimension, which is the thicknesswise dimension of the circumferential end surfaces of the first split bearing, and the second thicknesswise dimension, which is the thicknesswise dimension of the circumferential end surfaces of the second split bearing, are rendered equal to each other. Therefore, it is possible to prevent formation of a step on the inner circumferential side of each of regions where the first and second split bearings abut against each other. As a result, the flow of lubrication oil between the sliding bearings and the crankshaft can be made smooth, and oil film can be formed properly between the sliding bearings and the crankshaft.

BRIEF DESCRIPTION OF THE DRAWINGS

The above and other features and advantages of one or more embodiments will be apparent from the following detailed description made with reference to the accompanying drawings.

DETAILED DESCRIPTION

Embodiments of a crankshaft support structure will now be described with reference to the drawings. This support structure constitutes an engine. In one or more embodiments, the engine is of a six-cylinder V-type and is mounted on, for example, an automobile.

Figure 1:
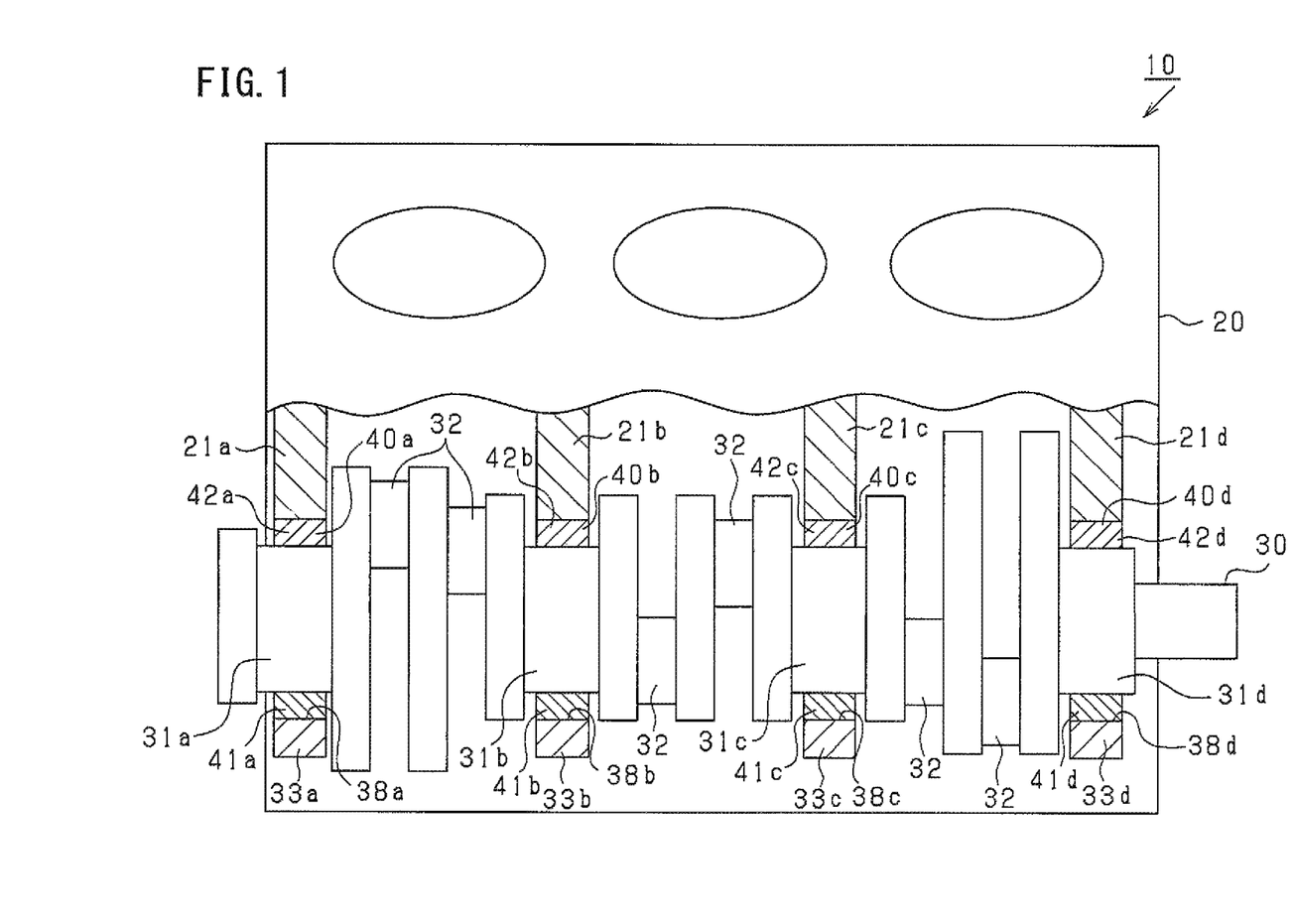
FIG. 1 View showing an engine.
Figure 2:
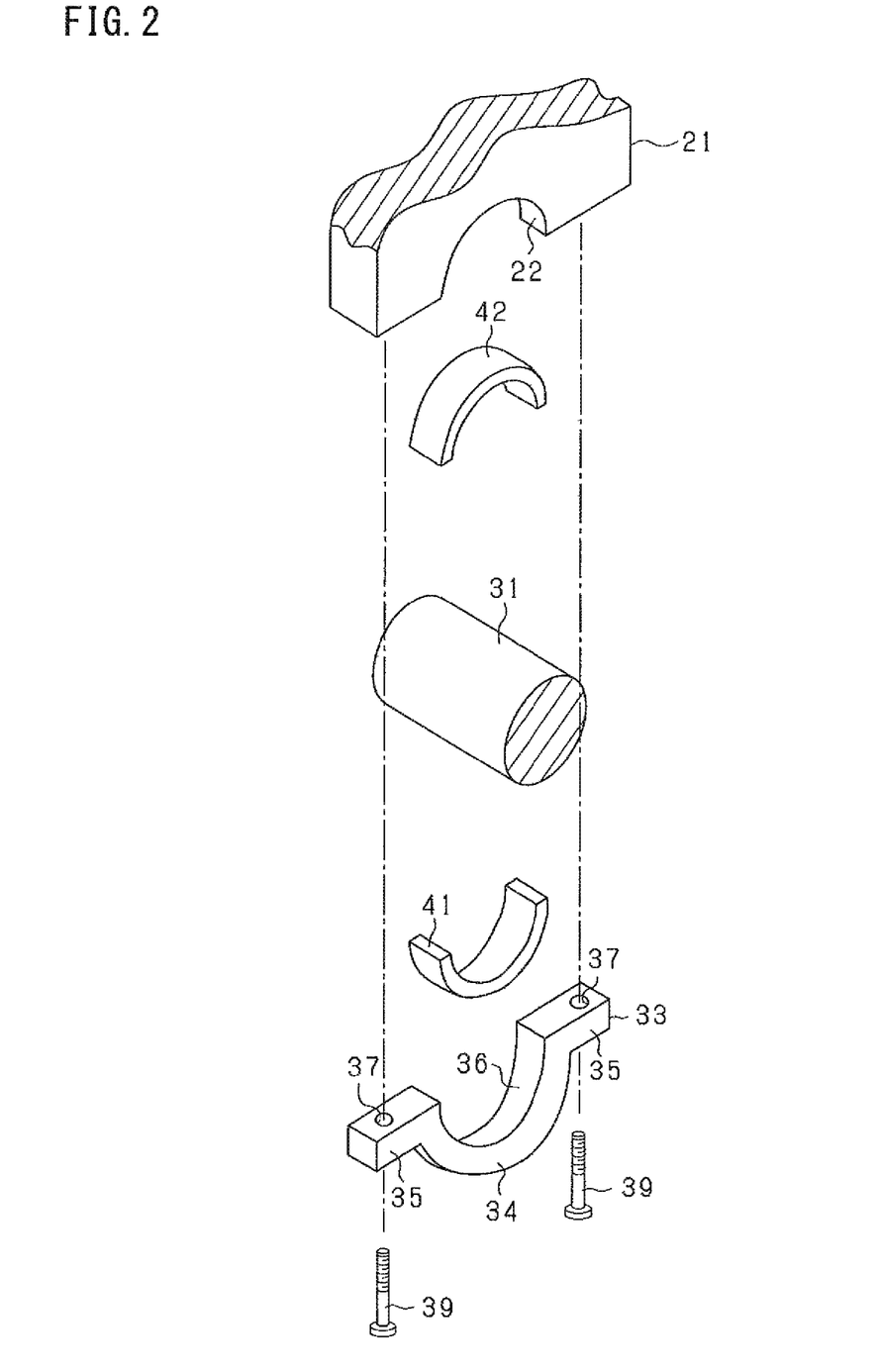
FIG. 2 Exploded perspective view of a portion of the engine.
Figure 3:
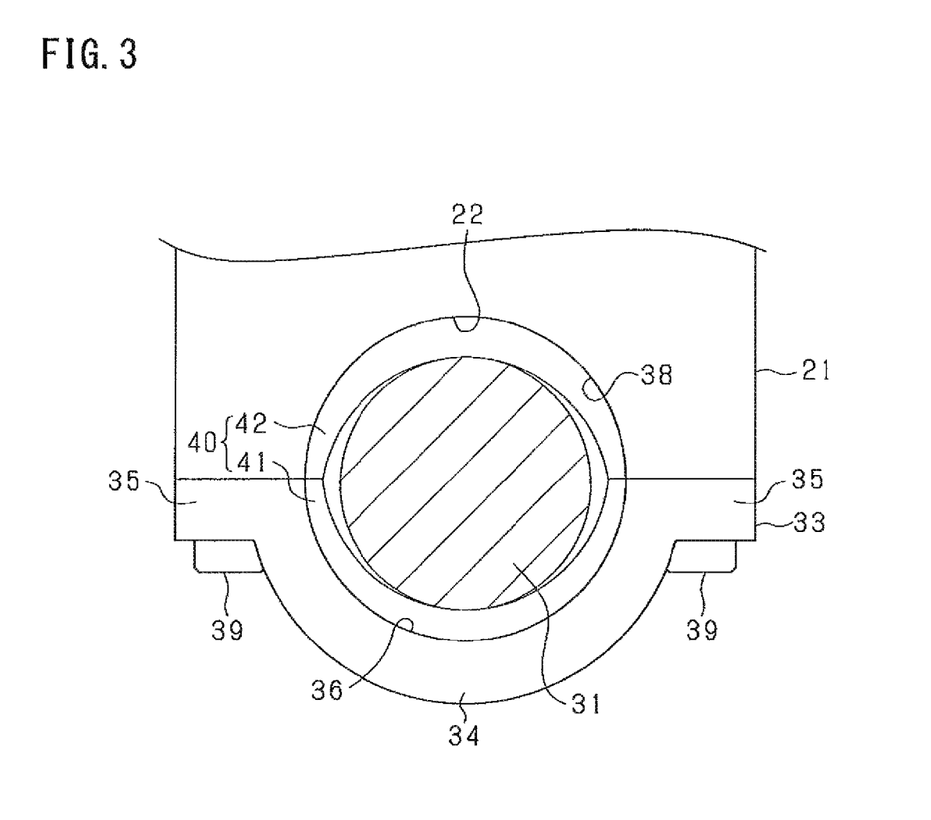
FIG. 3 View of a crankshaft support structure as viewed in the axial direction of a crankshaft.

First, the overall structure of an engine 10 will be described with reference to FIGS. 1 to 3.

The engine 10 comprises a cylinder block 20 and a crankshaft 30. The crankshaft 30 is formed of, for example, iron (e.g., cast iron). The crankshaft 30 has a plurality of journal portions and a plurality of crank pins arranged in a direction in which the axis of the crankshaft 30 extends. Specifically, the crankshaft 30 has first to fourth journal portions 31a to 31d, and the axes of the journal portions 31a to 31d are disposed on the axis of the crankshaft 30. Of the journal portions 31a to 31d, journal portions that are adjacent to each other in the direction in which the axis of the crankshaft 30 extends have the same width. Also, the journal portions 31a to 31d are formed in such a manner that the interval between journal portions that are adjacent to each other in the direction in which the axis of the crankshaft 30 extends is the same among the journal portions 31a to 31d.

On the crankshaft 30, crank pins 32 are provided between the first to fourth journal portions 31a to 31d. Each of the crank pins 32 is disposed on the crankshaft 30 to be sandwiched between corresponding ones of the first to fourth journal portions 31a to 31d. In one or more embodiments, since the engine 10 is of a six-cylinder V-type, the crank pins 32 are provided on the crankshaft 30 in such a manner that two crank pins 32 are sandwiched between corresponding ones of the first to fourth journal portions 31a to 31d. Each crank pin 32 is disposed with a radially outward offset from the axis of the crankshaft 30. Notably, an unillustrated connecting rod is rotatably coupled with each crank pin 32.

The cylinder block 20 is formed of, for example, aluminum. In the cylinder block 20, first to fourth cylinder-side mounting portions 21a to 21d corresponding to the first to fourth journal portions 31a to 31d are formed in a row. The cylinder-side mounting portions 21a to 21d are formed in such a manner that the interval between cylinder-side mounting portions that are adjacent to each other in the direction in which the axis of the crankshaft 30 extends is the same among the cylinder-side mounting portions 21a to 21d.

The engine 10 comprises first to fourth caps 33a to 33d. In one or more embodiments, the first to fourth caps 33a to 33d have the same shape. A central position in a direction extending along the axis of the crankshaft 30 is the midpoint between the second journal portion 31b and the third journal portion 31c. With respect to the central position serving as a reference, the first cap 33a and the fourth cap 33d are disposed symmetrically, and the second cap 33b and the third cap 33c are disposed symmetrically. The caps 33a to 33d are formed of, for example, cast iron.

The engine 10 comprises a first bearing 40a, a second bearing 40b, a third bearing 40c, and a fourth bearing 40d for rotatably supporting the first to fourth journal portions 31a to 31d. The first bearing 40a is a bearing for supporting the first journal portion 31a, and the second bearing 40b is a bearing for supporting the second journal portion 31b. The third bearing 40c is a bearing for supporting the third journal portion 31c, and the fourth bearing 40d is a bearing for supporting the fourth journal portion 31d. In one or more embodiments, a sliding bearing comprises paired upper and lower semi-annular bearings is used for the first to fourth bearings 40a to 40d. Each of the bearings 40a to 40d has a multi-layer structure including, for example, a lining layer and a back metal layer. Notably, as will be described later, the thicknesses of the upper bearings constituting the first and fourth bearings 40a and 40d and the thicknesses of the lower bearings constituting the second and third bearings 40b and 40c are smaller than the thicknesses of the lower bearings constituting the first and fourth bearings 40a and 40d and the thicknesses of the upper bearings constituting the second and third bearings 40b and 40c. However, in FIG. 1, for convenience, the bearings 40a to 40d are depicted to have the same thickness.

Support structures for the journal portions 31a to 31d will be described with reference to FIGS. 2 and 3. Notably, in one or more embodiments, the support structures for the journal portions 31a to 31d are basically the same. Therefore, in FIGS. 2 and 3, the suffixes a, b, c, and d of reference numerals assigned to respective members are omitted.

The cap 33 has a semi-circular arcuate receiving portion 34 and cap-side mounting portions 35 formed at opposite ends of the receiving portion 34. A portion of the receiving portion 34 on the inner circumferential side is a concave portion 36 which is concaved to form a semi-circular arcuate shape. A through hole 37 is formed in each of the cap-side mounting portions 35.

A concave portion 22 which is concaved to have a semi-circular arcuate shape is formed on the cylinder-side mounting portion 21. A bearing holding portion 38 is formed by the concave portion 22 of the cylinder-side mounting portion 21 and the concave portion 36 of the receiving portion 34. Namely, the bearing holding portion 38 is a hole defined by the concave portion 22 of the cylinder block 20 and the concave portion 36 of the cap 33. A bearing 40 is held in the bearing holding portion 38. Specifically, an outer circumferential surface of an upper bearing 42 is in contact with an inner circumferential surface of the concave portion 22 of the cylinder-side mounting portion 21, and an outer circumferential surface of a lower bearing 41 is in contact with an inner circumferential surface of the concave portion 36 of the receiving portion 34. In this state, screws 39 are screwed into threaded holes of the cylinder-side mounting portion 21 through the through holes 37. As a result, the cap 33 is fixed to the cylinder-side mounting portion 21, and the bearing 40 is held in the bearing holding portion 38.

The lower bearing 41 is a bearing which is one of a pair of split bearings constituting the bearing 40 and is located on the lower side, and the upper bearing 42 is a bearing which is the other of the pair of split bearings and is located on the upper side. The bearing 40 supports the journal portion 31 in a state in which circumferential end surfaces of the upper bearing 42 are in contact with circumferential end surfaces of the lower bearing 41.

Referring back to FIG. 1, a first bearing holding portion 38a for holding the first bearing 40a is formed by the concave portion of the first cylinder-side mounting portion 21a and the concave portion of the receiving portion of the first cap 33a. A second bearing holding portion 38b for holding the second bearing 40b is formed by the concave portion of the second cylinder-side mounting portion 21b and the concave portion of the receiving portion of the second cap 33b. A third bearing holding portion 38c for holding the third bearing 40c is formed by the concave portion of the third cylinder-side mounting portion 21c and the concave portion of the receiving portion of the third cap 33c. A fourth bearing holding portion 38d for holding the fourth bearing 40d is formed by the concave portion of the fourth cylinder-side mounting portion 21d and the concave portion of the receiving portion of the fourth cap 33d.

Figure 4:
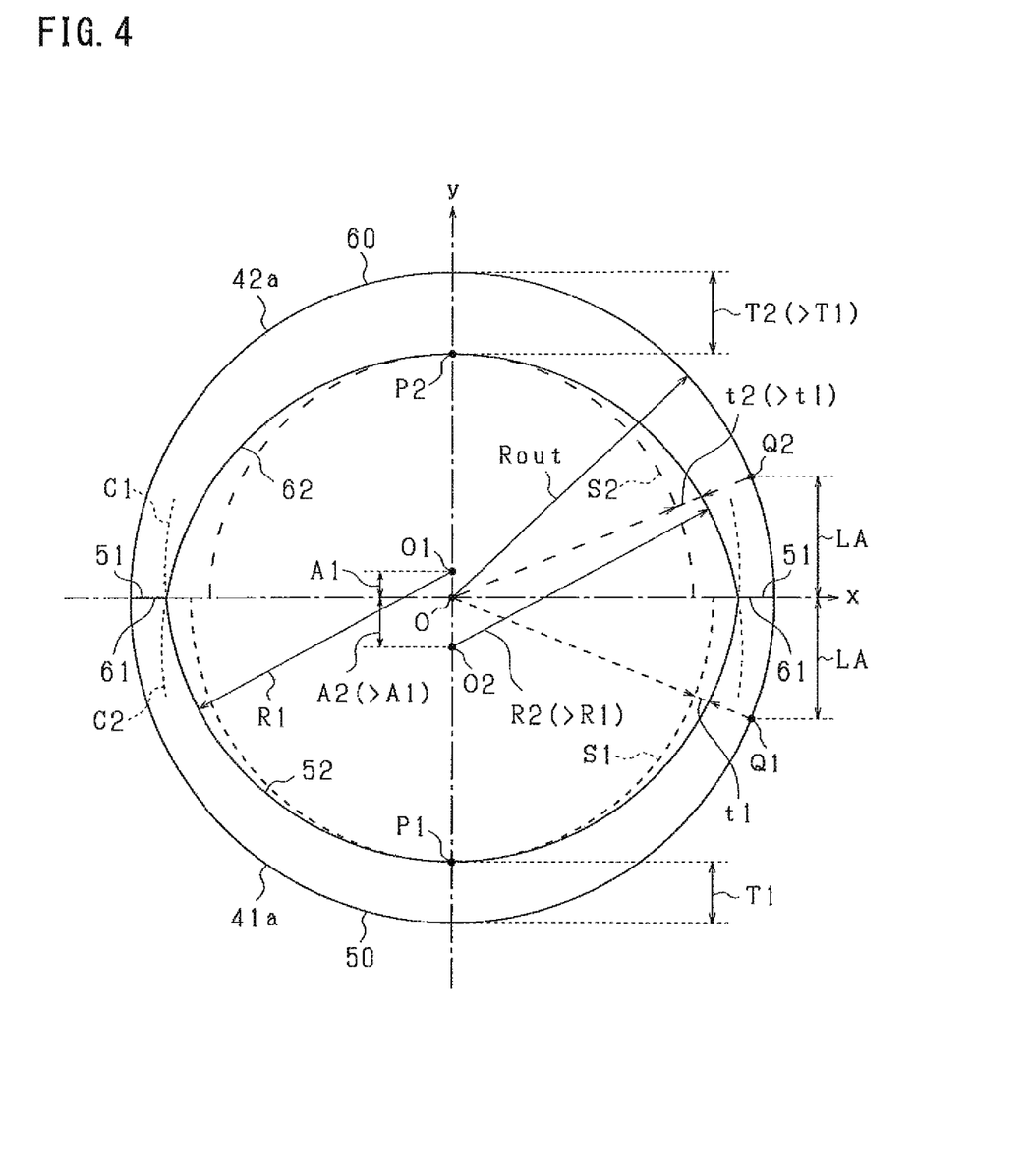
FIG. 4 View used for describing the structure of split bearings.

Next, the shape of the bearing 40 will be described in detail. In the following description, the first bearing 40a will be described as an example. FIG. 4 is a view of the first bearing 40a held by the bearing holding portion 38 as viewed in its thickness direction (the direction in which the crankshaft extends). Notably, in FIG. 4, the engine, the crankshaft, etc. are not shown for convenience of explanation.

The first lower bearing 41a and the first upper bearing 42a have the same outer diameter. Specifically, when the center of the outer circumference of the first bearing 40a is regarded as a reference point O, an outer circumferential surface 50 of the first lower bearing 41a and an outer circumferential surface 60 of the first upper bearing 42a are arcuate surfaces which extend along a circle whose center is located at the reference point O and which has a radius Rout. In FIG. 4, a straight line passing the circumferential end surfaces 51 of the first lower bearing 41a and the circumferential end surfaces 61 of the first upper bearing 42a is regarded as an x-axis. Also, a straight line passing the reference point O, the circumferentially central position P2 of the inner circumferential surface 62 of the first upper bearing 42a, and the circumferentially central position P1 of the inner circumferential surface 52 of the first lower bearing 41a is regarded as a y-axis. Notably, the y-axis also passes the circumferentially central position of the outer circumferential surface 60 of the first upper bearing 42a and the circumferentially central position of the outer circumferential surface 50 of the first lower bearing 41a, as well as the circumferentially central position P2 of the inner circumferential surface 62 of the first upper bearing 42a and the circumferentially central position P1 of the inner circumferential surface 52 of the first lower bearing 41a.

The thickness T2 of the first upper bearing 42a at the circumferentially central position is greater than the thickness T1 of the first lower bearing 41a at the circumferentially central position. The first lower bearing 41a decreases in thickness from the circumferentially central position P1 of the inner circumferential surface 52 toward the end surfaces 51.

A point which deviates from the reference point O by a first offset amount A1 toward the circumferentially central position P2 of the inner circumferential surface 62 of the first upper bearing 42a is regarded as a first center O1. The circumferentially extending inner circumferential surface 52 of the first lower bearing 41a is an arcuate surface which extends along a first reference circle C1 whose center is located at the first center O1 and whose radius is equal to a first reference distance R1 from the first center O1 to the circumferentially central position P1 of the inner circumferential surface 52 of the first lower bearing 41a.

The first upper bearing 42a decreases in thickness from the circumferentially central position P2 of the inner circumferential surface 62 toward the end surfaces 61. A point which deviates from the reference point O by a second offset amount A2 toward the central position P1 of the inner circumferential surface 52 of the first lower bearing 41a is regarded as a second center O2. The second offset amount A2 is larger than the first offset amount A1. The circumferentially extending inner circumferential surface 62 of the first upper bearing 42a is an arcuate surface which extends along a second reference circle C2 whose center is located at the second center O2 and whose radius is equal to a second reference distance R2 from the second center O2 to the central position P2 of the inner circumferential surface 62 of the first upper bearing 42a. The second reference distance R2 is longer than the first reference distance R1.

The first thicknesswise dimension of the circumferential end surfaces 51 of the first lower bearing 41a is rendered equal to the second thicknesswise dimension of the circumferential end surfaces 61 of the first upper bearing 42a by setting the first offset amount A1 to be smaller than the second offset amount A2 and setting the first reference distance R1 to be smaller than the second reference distance R2.

Notably, although not shown in FIG. 4, in general, crush relieves are formed at circumferential end portions of the inner circumferential side of the first lower bearing 41a and circumferential end portions of the inner circumferential side of the first upper bearing 42a. In this case, the first thicknesswise dimension of the first lower bearing 41a and the second thicknesswise dimension of the first upper bearing 42a can be rendered equal to each other by rendering the depth of the crush relieves of the first lower bearing 41a equal to the depth of the crush relieves of the first upper bearing 42a.

A first imaginary circle S1 whose center is located at the reference point O and whose radius is equal to the distance from the reference point O to the circumferentially central position P1 of the inner circumferential surface 52 of the first lower bearing 41a is shown by a broken line. The point of intersection between the outer circumferential surface 50 of the first lower bearing 41a and a straight line which is parallel to the x-axis and is apart from the x-axis by a prescribed distance LA is denoted by Q1. Of a straight line passing the reference point O and the point of intersection Q1, a distance between the point of intersection with the first imaginary circle S1 and the point of intersection with the inner circumferential surface 52 of the first lower bearing 41a is a first oil relief t1.

A second imaginary circle S2 whose center is located at the reference point O and whose radius is equal to the distance from the reference point O to the circumferentially central position P2 of the inner circumferential surface 62 of the first upper bearing 42a is shown by a broken line. The point of intersection between the outer circumferential surface 60 of the first upper bearing 42a and a straight line which is parallel to the x-axis and is apart from the x-axis by the prescribed distance LA is denoted by Q2. Of a straight line passing the reference point O and the point of intersection Q2, a distance between the point of intersection with the second imaginary circle S2 and the point of intersection with the inner circumferential surface 62 of the first upper bearing 42a is a second oil relief t2. The second oil relief t2 is greater than the first oil relief t1.

Subsequently, the second to fourth bearings 40b to 40d will be described.

The second lower bearing 41b constituting the second bearing 40b, the third lower bearing 41c constituting the third bearing 40c, and the fourth upper bearing 42d constituting the fourth bearing 40d have the same shape as the first upper bearing 42a constituting the first bearing 40a. The second upper bearing 42b constituting the second bearing 40b, the third upper bearing 42c constituting the third bearing 40c, and the fourth lower bearing 41d constituting the fourth bearing 40d have the same shape as the first lower bearing 41a constituting the first bearing 40a. In one or more embodiments, the first lower bearing 41a, the second upper bearing 42b, the third upper bearing 42c, and the fourth lower bearing 41d correspond to the "first split bearing," and the first upper bearing 42a, the second lower bearing 41b, the third lower bearing 41c, and the fourth upper bearing 42d correspond to the "second split bearing."

Figure 5A:
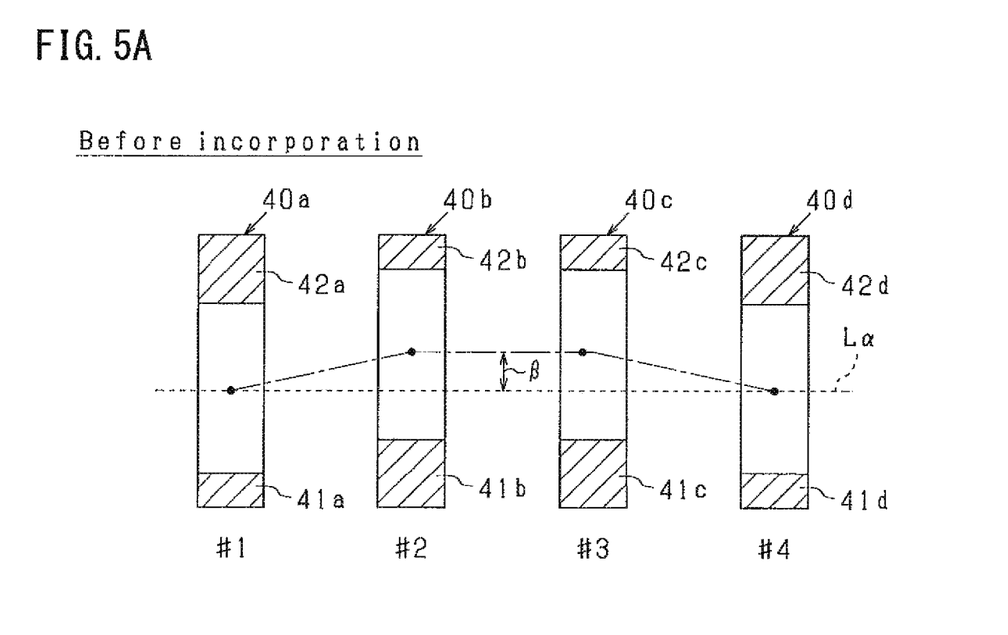
FIG. 5A Views used for describing an effect of improving coaxiality.
Figure 5B:
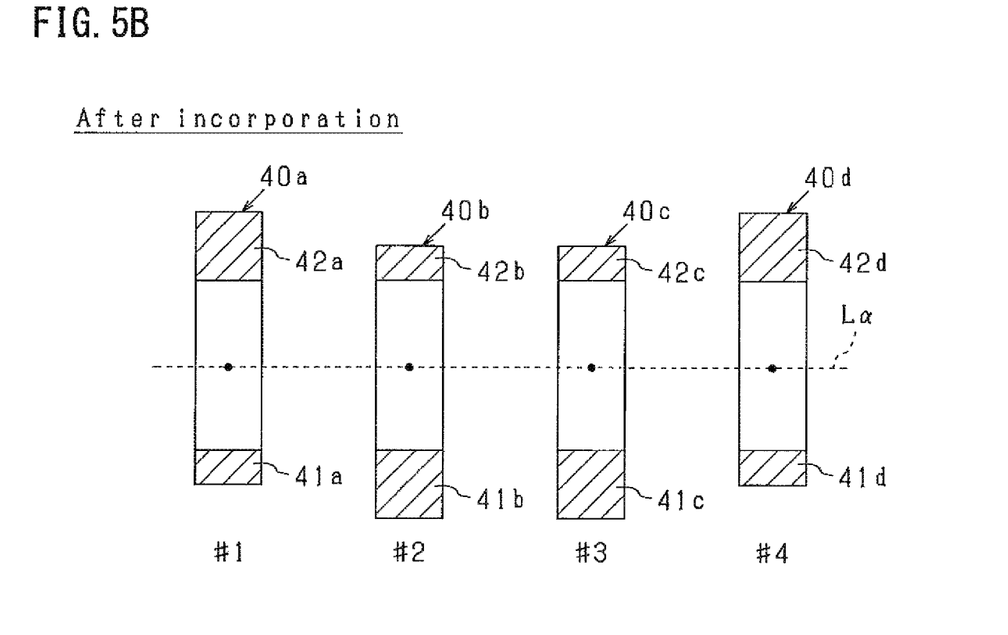
FIG. 5B Views used for describing an effect of improving coaxiality.

Next, the state of disposition of the first to fourth bearings 40a to 40d which are incorporated into the engine 10 will be described. FIG. 5A shows the positions of the bearings 40a to 40d before completion of the engine 10. FIG. 5B shows the positions of the bearings 40a to 40d after completion of the engine 10. In FIGS. 5A and 5B, a line connecting the centers of the inner circumferences of the bearings 40a to 40d is shown by an alternate long and short dash line, and an axis passing the centers of the inner circumferences of the first bearing holding portion 38a and the fourth bearing holding portion 38d is regarded as a reference straight line Lα (broken line in the drawings). "#1," "#2," "#3," and "#4" represent the numbers of the first to fourth journal portions 31a to 31d. The reference straight line Lα is assumed to be parallel to a direction extending along the axis of the crankshaft 30.

In the first bearing 40a, the thickness of the first upper bearing 42a is set to be greater than the thickness of the first lower bearing 41a. In the second bearing 40b, the thickness of the second lower bearing 41b is set to be greater than the thickness of the second upper bearing 42b. In the third bearing 40c, the thickness of the third lower bearing 41c is set to be greater than the thickness of the third upper bearing 42c. In the fourth bearing 40d, the thickness of the fourth upper bearing 42d is set to be greater than the thickness of the fourth lower bearing 41d. In one or more embodiments, as described above, the first upper bearing 42a, the second lower bearing 41b, the third lower bearing 41c, and the fourth upper bearing 42d have the same shape. Also, the first lower bearing 41a, the second upper bearing 42b, the third upper bearing 42c, and the fourth lower bearing 41d have the same shape. Notably, the first and fourth bearings 40a and 40d correspond to the "end bearings," and the second and third bearings 40b and 40c correspond to the "intermediate bearing."

As shown in FIG. 5A, before completion of the engine 10, since the thicknesses of the lower bearings 41b and 41c of the second and third bearings 40b and 40c are large, the centers of the inner circumferences of the second and third bearings 40b and 40c are located upward of the centers of the inner circumferences of the first and fourth bearings 40a and 40d. As a result, the line connecting the centers of the inner circumferences of the bearings 40a to 40d is convex upward in relation to the reference straight line Lα.

When a cylinder head and a cylinder head gasket are attached to the cylinder block 20, elastic bending deformation occurs in the cylinder block 20 due to the attachment. Due to this bending deformation, as shown in FIG. 5B, the centers of the inner circumferences of the first to fourth bearings 40a to 40d coincide with the reference straight line Lα. As a result, the coaxiality of the first to fourth bearings 40a to 40d is prevented from being impaired.

In the engine 10, of the split bearings constituting the first to fourth bearings 40a to 40d, the second and third lower bearings 41b and 41c constituting the intermediate second and third bearings 40b and 40c receive larger loads (for example, loads from the connecting rods) as compared with the remaining split bearings. As a result, it is feared that the temperatures of the second and third lower bearings 41b and 41c rise excessively. In one or more embodiments, the second oil relieves t2 of the second and third lower bearings 41b and 41c are greater than the second oil relieves t2 of the first and fourth lower bearings 41a and 41d. Therefore, it is possible to properly form oil films between the second bearing 40b and the second journal portion 31b and between the third bearing 40c and the third journal portion 31c by increasing the amount of lubrication oil supplied to the gap between the second lower bearing 41b and the second journal portion 31b and the gap between the third lower bearing 41c and the third journal portion 31c. As a result, it is possible to prevent the temperatures of the second and third lower bearings 41b and 41c from rising excessively.

Subsequently, equalization of the first and second thicknesswise dimensions will be described in further detail. In the following description, the first bearing 40a will be described as an example.

As shown in FIG. 5A, the amount of deviation of the centers of the inner circumferences of the second and third bearings 40b and 40c before completion of the engine from the reference straight line Lα is denoted by β. The deviation amount β may be determined by performing, for example, an experiment or simulation. Also, β/2 is represented by Δt (i.e., Δt=β/2), and a reference thickness of the first lower bearing 41a and the first upper bearing 42a is represented by TS. In this case, as shown in FIG. 4, the thickness T1 of the first lower bearing 41a at the circumferentially central position and the thickness T2 of the first upper bearing 42a at the circumferentially central position are represented by the following expressions (1) and (2), respectively.

$$T1 = TS - \Delta T \quad (1)$$

$$T2 = TS + \Delta T \quad (2)$$

Subsequently, the first reference distance R1 and the first offset amount A1 are determined in such a manner that the first oil relief t1 of each of the lower bearings 41a to 41d can form oil film properly. As a result of the shape of the first oil relief t1 being determined, the first thicknesswise dimension of the end surfaces 51 of each of the lower bearings 41a to 41d is determined. Notably, the first reference distance R1 may be determined by performing, for example, an experiment or simulation.

Subsequently, the second reference distance R2 and the second offset amount A2 are determined in such a manner that the dimension of the end surfaces 61 of each of the upper bearings 42a to 42d becomes equal to the first thicknesswise direction. Specifically, a second reference circle C2 which passes the points of intersection between the first reference circle C1 and the x-axis and the central position P2 of the inner circumferential surface 62 of the first upper bearing 42a is determined. The second offset amount A2 is set to be larger than the first offset amount A1, and the second reference distance R2 is set to be larger than the first reference distance R1. As a result of the second reference circle C2 being determined, the second offset amount A2 and the second reference distance R2 are determined. Notably, as described above, the first reference circle C1 is a circle whose center is located at the first center O1 and whose radius is equal to the first reference distance R1.

In the above-described embodiments, the following effect can be yielded.

The outer diameters of the first lower bearing 41a and the first upper bearing 42a, which constitute the first bearing 40a, are equal to each other. The thickness T2 of the first upper bearing 42a at the circumferentially central position is rendered greater than the thickness T1 of the first lower bearing 41a at the circumferentially central position. The thicknesswise dimension of the circumferential end surfaces 61 of the first upper bearing 42a is rendered equal to the thicknesswise dimension of the circumferential end surfaces 51 of the first lower bearing 41a. As a result, it is possible to prevent formation of a step on the inner circumferential side of each of regions where the first upper and lower bearings 42a and 41a abut against each other. The same is true of the second to fourth bearings 40b to 40d. Therefore, the flow of lubrication oil between the first to fourth bearings 40a to 40d and the first to fourth journal portions 31a to 31d can be made smooth, and oil films can be formed properly between the first to fourth bearings 40a to 40d and the first to fourth journal portions 31a to 31d.

Of the split bearings, the second and third lower bearings 41b and 41c are located at intermediate positions in the direction in which the axis of the crankshaft 30 extends and the second oil relieves t2 of the second and third lower bearings 41b and 41c are larger than the second oil relieves t2 of the first and fourth lower bearings 41a and 41d. Therefore, the amount of lubrication oil supplied to the gaps between the second and third lower bearings 41b and 41c and the second and third journal portions 31b and 31c can be increased. As a result, it is possible to prevent excessive temperature rising of the second and third lower bearings 41b and 41c located at the intermediate positions, while preventing impairment of the coaxiality of the crankshaft 30 to the greatest extent possible.

Other Embodiments

The above-described embodiments may be modified as follows.

The engine 10 may be of a four-cylinder type. In this case, since five journal portions are provided on the crankshaft, five bearings for the five journal portions are disposed on the engine 10. Of the five journal portions, three journal portions are located at intermediate positions in the direction in which the axis of the crankshaft extends, and bearings for the three journal portions serve as the intermediate bearings.

In the case where five bearings are provided for the five journal portions of the crankshaft, in the three intermediate bearings, their oil relieves may be adjusted in accordance with the loads acting on their lower bearings. In this case, for a bearing among the intermediate bearings, (for example, the third bearing located at the center) in which the largest load acts on its lower bearing, the first offset amount A1 and the first reference distance R1 may be determined in such a manner that the oil relief of that bearing becomes the largest.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

20: cylinder block, 30: crankshaft, 31: journal portion, 38: bearing holding portion, 40: bearing, 41: lower bearing, 42: upper bearing.

What is claimed is:
1. A crankshaft support structure comprising:
a plurality of sliding bearings, wherein
each of the sliding bearings comprises:
   a semi-annular first split bearing having a first circumferential end surface; and
   a semi-annular second split bearing having a second circumferential end surface, wherein
the first and second circumferential end surfaces contact each other,
the first split bearing has a same outer diameter as an outer diameter of the second split bearing,
the second split bearing has a thickness at a second circumferentially central position that is greater than a thickness of the first split bearing at a first circumferentially central position,
the thickness of the first split bearing is decreased from the first circumferentially central position toward the first circumferential end surface,
the thickness of the second split bearing is decreased from the second circumferentially central position toward the second circumferential end surface,
an inner circumferential surface of the first split bearing is defined as an arcuate surface along a first reference circle that has a first center and a first radius, wherein the first center is a point that deviates from a center of a circle along an outer circumference of the sliding bearing by a first offset amount toward the second circumferentially central position on an inner circumferential surface of the second split bearing, and the first radius is a first reference distance from the first center to the first circumferentially central position on the inner circumferential surface of the first split bearing,
an inner circumferential surface of the second split bearing is defined as an arcuate surface along a second reference circle that has a second center and a second radius, wherein the second center is a point that deviates from the center of the circle along the outer circumference of the sliding bearing by a second offset amount toward the first circumferentially central position on the inner circumferential surface of the first split bearing, and the second radius is a second reference distance from the second center to the second circumferentially central position on the inner circumferential surface of the second split bearing, and
the first offset amount is smaller than the second offset amount, the first reference distance is shorter than the second reference distance, and the first circumferential end surface has a same thickness as a thickness of the second circumferential end surface,
the crankshaft support structure supports a crankshaft having three or more journal portions,
the first split bearing and the second split bearing are disposed in a bearing holding portion of a cylinder block that respectively supports upper and lower sides of each of the journal portions, and
in a case where, among the sliding bearings arranged in a line, each of the sliding bearings disposed at both ends are defined as an end bearing, and at least one remaining sliding bearing is defined as an intermediate bearing, the first split bearing of the intermediate bearing and the second split bearing of the end bearing support the upper sides of the journal portions, and the second split bearing of the intermediate bearing and the first split bearing of the end bearing support the lower sides of the journal portions.

* * * * *